United States Patent [19]

Tsubota

[11] Patent Number: 4,747,564
[45] Date of Patent: May 31, 1988

[54] BRAKE SYSTEM FOR MAGNETIC RECORDING AND REPRODUCING APPARATUS

[75] Inventor: Shinya Tsubota, Mito, Japan
[73] Assignee: Hitachi, Ltd., Tokyo, Japan
[21] Appl. No.: 23,394
[22] Filed: Mar. 9, 1987

[30] Foreign Application Priority Data

Mar. 12, 1986 [JP] Japan .................................. 61-52355

[51] Int. Cl.⁴ ..................... B65H 16/10; G11B 15/32; F16D 51/00
[52] U.S. Cl. ................................ 242/204; 242/156.2; 188/74; 188/166; 360/96.3
[58] Field of Search ..................... 242/156.2, 192, 201, 242/204, 210, 75.4, 75.43, 197–200, 202, 203; 360/96.1–96.4, 74.1–74.3; 188/74, 166

[56] References Cited

U.S. PATENT DOCUMENTS 2,939,644 6/1960 Morrison et al. .................. 242/210
3,448,940 6/1969 Atsumi .............................. 242/204
3,670,992 6/1972 Goshima et al. .................... 242/204

FOREIGN PATENT DOCUMENTS 26249 12/1968 Japan .................................. 242/204

Primary Examiner—David Werner
Attorney, Agent, or Firm—Antonelli, Terry & Wands

[57] ABSTRACT

A brake system for a magnetic recording and reproducing apparatus especially suited to an apparatus wherein an operation mode is provided on both sides of a stop mode. A braking of the brake system can be released in the respective modes upon both sides of the stop position, and the braking can be instantly applied at the time of transfer from the fast-foward or rewind mode to the stop mode. The brake system includes a turning arm constructed so as to be extensible and contractable and operable both for an application and release of the braking in dependence upon whether the turning arm is turned in a contracted or extended state.

4 Claims, 3 Drawing Sheets

BRAKE SYSTEM FOR MAGNETIC RECORDING AND REPRODUCING APPARATUS

BACKGROUND OF THE INVENTION

The present invention relates to a brake system for a magnetic recording and reproducing apparatus and, more particularly, to a brake system for a magnetic recording and reproducing apparatus wherein a stop mode is held between other modes, such as a VTR (video tape recorder) of the 8 mm-FORMAT or a VTR of the $\beta$-FORMAT.

In a VTR of the VHS-FORMAT, there is usually adopted a method wherein tape loading is not performed at the stage at which a tape cassette has been inserted into the apparatus, but it is performed in advance of a recording or reproducing mode. That is, fast-forward and rewind is performed in the state in which a tape is accommodated within the tape cassette. In view of the state of the apparatus, therefore, a position nearest a stop position is a fast-forward or rewind position, and the stop must be transferred to the recording or reproducing after the tape loading has been performed first. Accordingly, when the fast-forward or rewind position and a recording or reproducing position are provided before and behind the stop position, a period of time is required for returning from the fast-forward or rewind position to the recording or reproducing position is superfluously expended in case of transferring from the fast-foward or rewind to the recording or reproducing, so that the facility of handling degrades. In the apparatus of this type, therefore, the mode array of stop to fast-forward or rewind→tape loading→recording or reproducing is commonly adopted.

In the magnetic recording and reproducing apparatus having such a mode array, it suffices to release a brake system at the stage of the transfer from the stop to another mode and to apply braking at the stage of the transfer from the fast-forward or rewind to the stop. Therefore, the brake system is comparatively simple, and it is often constructed of the combination of mechanical parts.

On the other hand, in the VTR of, for example, a 8 mm-FORMAT, the angle of winding of a tape around the cylinder of a rotary head is large (for example, as great as about 220°), so that the tape is wound around the cylinder beforehand at stop in order to shorten the period of time required for tape loading or tape unloading. With this method, fast-forward or rewind and recording or reproducing can be immediately performed under the state under which the tape is wound around the cylinder. In view of the state of the apparatus, accordingly, both the fast-forward or rewind and the recording or reproducing are at the same degree of nearness as to both a period of time and power consumption required for the operation, and the apparatus can be operated with a fast-forward or rewind position and a recording or reproducing position provided before and behind a stop position. In the magnetic recording and reproducing apparatus of this type, accordingly, the mode array of tape loading to fast-forward or rewind to stop to recording or reproducing is commonly adopted.

In the magnetic recording and reproducing apparatus having such a mode array, it is necessary to release braking at the two stages of the stage of transfer from the stop to the fast-forward or rewind and the stage of transfer from the stop to the recording or reproducing. Moreover, in the case of transfer from the fast-forward or rewind mode to the stop mode, the braking needs to be applied instantly, that is, a brake system needs to be constructed with a quick brake function, for the purpose of preventing the overrun of the tape. When the brake system which performs such intricate operations of high accuracy is mechanically constructed, it becomes structurally complicated. Therefore, a solenoid has heretofore been ordinarily used as a driving source in the brake system of the magnetic recording and reproducing apparatus of this type.

Since, however, the solenoid is an expensive component which is heavy and dissipates a high current, the installation thereof renders the magnetic recording and reproducing apparatus costly and also poses the problems in practical use that the weight of the apparatus increases and that the replacement cycle of batteries shortens. Besides, in point of reliability indispensable to the apparatus of this type, there are the problems in practical use that the temperature characteristic of the apparatus might change and that the operations of the apparatus at a low temperature, a high temperature, etc. might be interfered with. The VTR's of the 8 mm-FORMAT and the $\beta$-FORMAT are greatly meritorious in that they are inexpensive and that the apparatuses can be small and light weight. Accordingly, the installation of the solenoid is contrary to these requirements. Therefore, a mechanical brake system which is structurally simple and which is applicable to the VTR's of the 8 mm-FORMAT and the $\beta$-FORMAT has heretofore been eagerly desired.

SUMMARY OF THE INVENTION

The aim underlying the present invention essentially resides in avoiding the above mentioned problems encountered in the prior art.

In accordance with the present invention, a brake arm is provided with a friction part at one end thereof, with the brake arm being turnably arranged in a vicinity of a side surface of each reel table. The brake arm are provided with a spring part which normally urges the friction parts toward the corresponding reel tables. A swing part brings the friction parts away from the corresponding reel tables against forces of the spring part, and a turning arm is connected to one end of the swing part. The turning arm is constructed so as to be extensible and contractable whereupon, when turned in the contracted state, the turning arm swings the swing part to bring the friction part away from the corresponding reel tables, while, when extended, it brings the swing part into a no-load state to press the friction parts against the corresponding reel tables thereby setting up a drive means for turning the turning arm when an operation other than stop, hereinbelow also designated "operation mode" is selected, and drive means for extending the turning arm when a stop operation, hereinbelow also called a "stop mode", is selected.

With the brake system of the magnetic recording and reproducing apparatus constructed in accordance with the present invention, by turning the turning arm in either rotary direction of the clockwise or counterclockwise direction, the swing part and the brake arms are brought into engagement, to turn the brake arms in the directions of releasing braking against the spring means, so that the braking can be released in both the loading direction and the unloading direction.

Moreover, by extending the turning arm, the swing part is forcibly swung in the direction of releasing the engagement thereof with the brake arms, so that the brake arms are instantly restored into braking directions by the action of the spring part, and the fast-forward or rewind operation can be instantly subjected to braking.

DESCRIPTION OF THE PREFERRED EMBODIMENTS

Now, embodiments of the present invention will be described with reference to the drawings.

Figure 1:
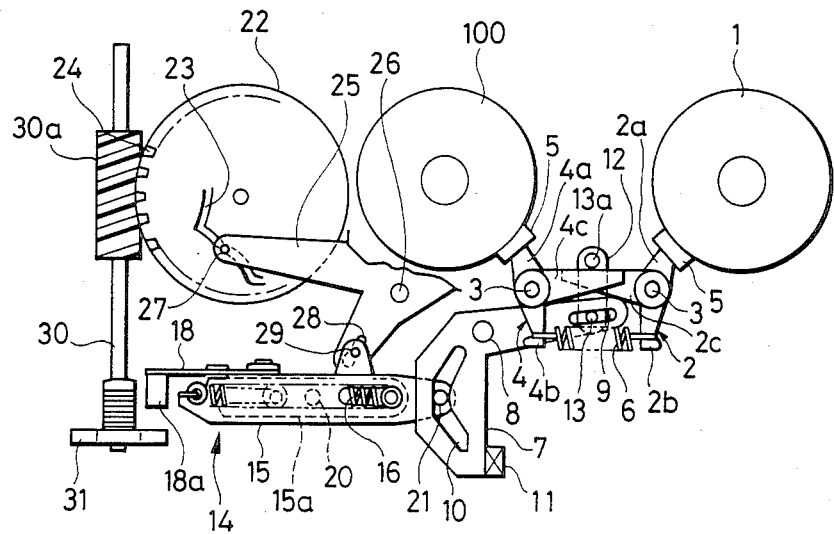
FIG. 1 is a plan view of a brake system showing the engagement states of various parts of an apparatus of the present invention, in a stop mode.

Referring now to the drawings wherein like reference numerals are used throughout the various views to designate like parts and, more particularly, to FIG. 1, according to this figure, a pair of reel tables 1, 100 drive and rotate reels (not shown) for stretching a magnetic tape there across, with brake arms 2, 4 being respectively arranged in a vicinity of the side surfaces of the reel tables 1, 100. The brake arms 2, 4 are each fashioned of three unitary arms 2a, 2b, 2c and 4a, 4b, 43c, and arbors 3. A friction part 5 is attached to a forward end of one of the three unitary arms 2a or 4a. By turnably mounting the arbors 3 in a chassis (not shown) the brake arms 2, 4 are held so that the friction part 5 can properly come into and out of engagement with the corresponding reel tables 1, 100. An urging member such as, for example, a spring part 6, extends across another arm 2b and arm 4b of the respective three arms, and it normally urges the friction parts 5 in a direction for pressing them against the side surfaces of the reel tables 1, 100. Further, the arms 2c and 4c are set in a positional relationship and at a length according to which they intersect at all times with the turning ranges of the respective brake arms 2, 4.

A substantially L-shaped swing part or member 7 is mounted so as to be freely swingable in such a manner that an arbor 8 disposed substantially at a middle of the swing part 7 is turnably mounted on the chassis (not shown). A slot 9 is provided at a forward end part of the swing member 7, while a substantially V-shaped cam hole 10 is provided along a rear side thereof. A stopper 11 is mounted on the chassis (not shown), and controls one stop position of the swing part 7.

A connector 12 connects the brake arms 2, 4 and the swing part 7. At both end parts of the connector 12, engaging pins 13, 13a are provided, with the engaging pin 13 being slidably inserted through a slot 9 provided at a forward end part of the swing part of member 7, and the other engaging pin 13a being arranged in proximity to the outer side parts of the arms 2c and 4c combined crosswise.

Figure 2:
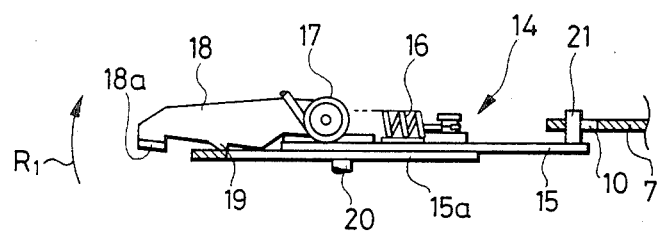
FIG. 2 is a side view showing the setup of a turning arm of the present invention.

A turning arm 14 controls the swing part 7, and as shown in FIG. 2, the turning arm 14 includes of two slide plates 15 and 15a, with a spring part 16 extending across the slide plates 15 and 15a for urging both slide plates 15 and 15a in an extended or stretched direction. On one side plate 15, a stopper 18 is rotatably mounted which is urged toward the other slide plate 15a by a return spring 17. The turning arm 14 is normally held in a contracted state in such a manner that the two slide plates 15 and 15a are contracted against the spring part 16 and a lug 19, protruding from the stopper 18 is held in engagement with the side end part of the other slide plate 15a. On the other hand, the turning arm 14 can be stretched on occasion in such a manner that the engagement between the lug 19 and the other slide plate 15a is released by turning the stopper 18 in the direction of arrow $R_1$ in FIG. 2 against the return spring 17. This turning arm 14 is held in such a manner that an anchoring pin 20 disposed on the backside of the other slide plate 15a is rotatably mounted on the chassis (not shown). The turning arm 14 is connected with the swing part 7 in such a manner that a connecting pin 21 mounted on the forward end part of one slide plate 15 is slidably inserted through the cam hole 10 provided in the swing part 7.

The cam hole 10 is so shaped, when the turning arm 14 is at the stop position as illustrated in FIG. 1, the connecting pin 21 and the swing part 7 lie in a no-load state (in this case, the engaging pin 13a is disengaged from both the arms 2c and 4c), that when the turning arm 14 has turned in either direction of the clockwise or counterclockwise direction under the contracted state, the connecting pin 21 and the swing part 7 come into engagement so as to swing the swing part 7 in the direction of releasing braking. When the turning arm 14 has stretched under the state under which it has turned to a fast-forward or rewind position, the connecting pin 21 and the swing part 7 come into engagement so as to swing the swing part 7 in the direction of applying the braking.

A cam gear 22 has a flat surface formed with a cam groove 23 in a shape corresponding to the respective operation modes and a peripheral surface having teeth 24 meshing with a worm gear 30a.

Figure 4:
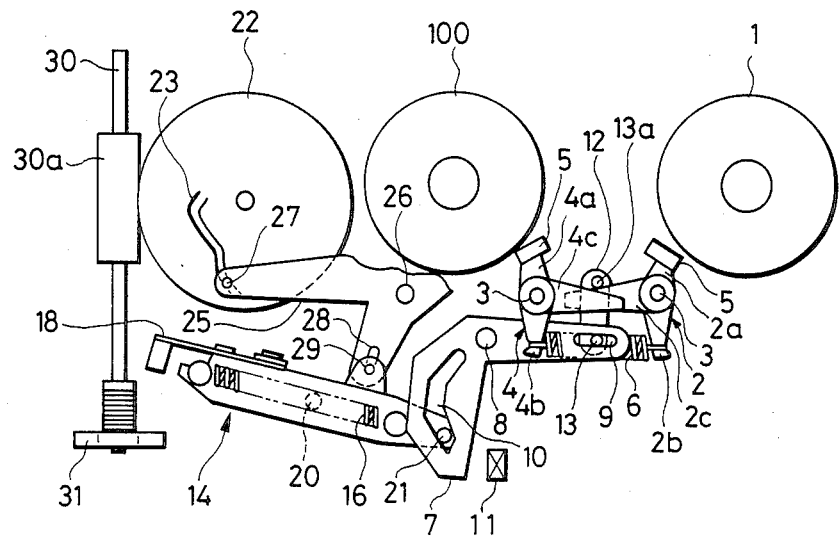
FIG. 4 is a plan view of a brake system showing the engagement states of various parts of an apparatus in a recording or reproducing mode according to the present invention.

A bifurcate cam arm 25 is positionally controlled by the cam groove 23 of the cam gear 22, and is held free to swing in such a way that an arbor 26 disposed substantially at a middle of the cam arm 25 is rotatably mounted on the chassis (not shown). A pin 27, engageable with the cam groove 23, is disposed on one projecting end part of the cam arm 25, while a slot 28 is provided in another projecting end part thereof. As best shown in FIGS. 1 and 4, an engaging pin 29 protruded from one side edge of the turning arm 14 is inserted through the slot 28, and the cam arm 25 is swung following the cam groove 23, thereby properly turning the arm 14 in a clockwise or direction.

Figure 3:
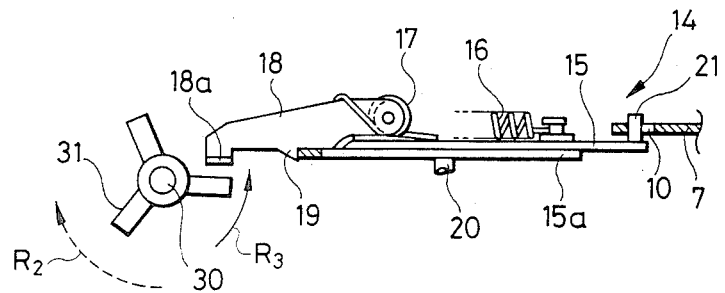
FIG. 3 is a side view showing the state of engagement between a stopper and a ratchet of the present invention.

A rotary shaft 30 is rotated in a forward or reverse direction by a driving source, for example, motor (not shown). The rotary shaft 30 is unitarily furnished with the worm gear 30a which meshes with the teeth 24 of the cam gear 25. In addition, a ratchet 31 which releases the stopper 18 at a predetermined timing is set at an end of the rotary shaft 30. A unidirectional ratchet (not shown) is additionally provided between the ratchet 31 and the rotary shaft 30, and in a case where the ratchet 31 is rotated in a clockwise direction (in a direction indicated by arrow $R_2$) as illustrated in FIG. 3, it abuts against the forward end 18a of the stopper 18 and is stopped from rotating. In this case, accordingly, only the rotary shaft 30 runs idle. To the contrary, in a case where the ratchet 31 is rotated in a counterclockwise direction (in a direction indicated by arrow $R_3$), it releases the stopper 18 integrally with the rotary shaft 30. This ratchet 31 is so located as to be engageable with the stopper 18 when the turning arm 14 has been turned to the fast-forward or rewind position.

Now, the operation of the brake system according to the embodiment constructed as stated above will be described.

First, in a case where the pin 27 lies in engagement with the stop position of the cam groove 23 (the position at which the pin 27 stops as illustrated in FIG. 1), the turning arm 14 is at the neutral position as shown in FIG. 1, and the connecting pin 21 erected at the end part of the turning arm 14 (at the right end part in the illustrated example) is snugly fitted in the neutral position of the cam hole 10 provided in the swing part 7, so that no force acts between the turning arm 14 and the swing part 7. Accordingly, no forces are exerted between the swing part 7 and the brake arms 2, 4, with brake arms 2, 4 being turned toward the reel tables 1, 100 by the elastic forces of the spring part 6, and the friction parts 5 being pressed against the side surfaces of the reel tables 1, 100.

In a case where the recording or reproducing operation has been selected, the motor (not shown) rotates the cam gear 22 to a predetermined position through the worm gear 30a. Consequently, the pin 27 moves to the reproducing position or recording position of the cam groove 23. Then, as illustrated in FIG. 4, the turning arm 14 is turned according to the turning of the cam arm 25, and the pin 21 disposed on the turning arm 14 draws the rear end part of the swing member 7 so as to swing this swing member 7. Upon a swinging of the swing member 7, the engaging pin 13a on the connector 12 comes into engagement with the arms 2c and 4c, the brake arms 2 and 4 are turned against the tension of the spring part 6, and the friction parts 5 are brought away from the reel tables 1 and 100.

Figure 5:
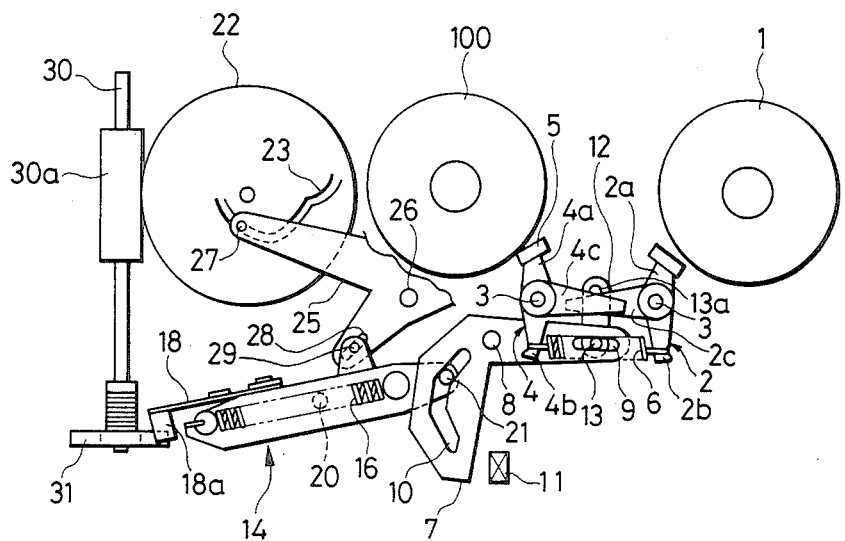
FIG. 5 is a plan view of a brake system showing the engagement states of various parts of an apparatus in a fast-forward ore rewind mode according to the present invention.

Besides, in a case where the fast-forward or rewind operation has been selected, the rotation of the motor (not shown) is reversed to rotate the cam gear 22 to a predetermined fast-forward position or rewind position. The pin 27 moves to the fast-forward position or rewind position along the cam groove 23. Then, as illustrated in FIG. 5, the turning arm 14 is turned in a direction opposite to the above recording or reproducing position, following the turning of the cam arm 25, and the pin 21 presses the rear end part of the swing member 7 so as to swing this swing member 7. As in the foregoing case of the recording or reproducing position, when the swing part 7 is swung, the engaging pin 13a comes into engagement with the arms 2c and 4c, the brake arms 2 and 4 are turned against the tensions of the spring part 6, and the friction parts 5 are brought away from the reel tables 1 and 100. On this occasion, the forward 18a of the stopper 18 is turned to the position where it can engage the ratchet 31.

Figure 6:
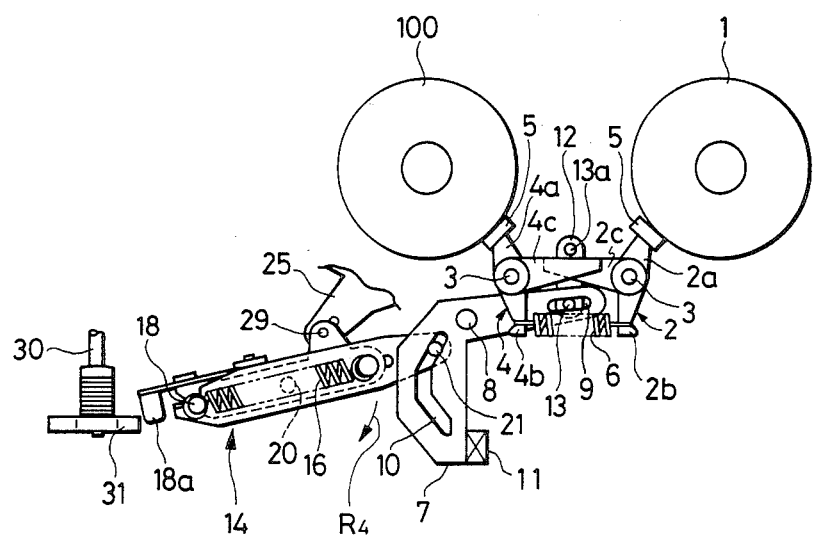
FIG. 6 is a plan view showing the engagement states of various parts of an apparatus at the time of transfer from the fast-forward or rewind mode to the stop mode in an embodiment of the present invention.

When the apparatus is to be transferred from the fast-forward position or rewind position to the stop mode, the rotary shaft 30 and the ratchet 31 are unitarily rotated in a counterclockwise direction as illustrated in FIG. 3. When the ratchet 31 and the forward end 18a of the stopper 18 come into engagement, the stopper 18 is turned against the return spring 17 by the driving force of the rotary shaft 30, and the engagement between the lug 19 and the other slide plate 15a is released. Upon the release of the engagement between the lug 19 and the other slide plate 15a, the turning arm 14 is instantly stretched by the urging forces of the spring part 16 extended between the two slide plates 15 and 15a, and it forcibly swings the swing part or member 7 in a counterclockwise direction as illustrated in FIG. 6. Upon the counterclockwise swing of the swing part 7, the engagement between the swing part 7 and the brake arms 2, 4 is released, and the brake arms 2, 4 are turned by the urging forces of the spring part 6, so that the friction parts 5 are instantly pressed against the reel tables 1, 100.

When the cam gear 22 is further rotated from this state, the turning arm 14 is rotated toward the neutral position (in a direction indicated by arrow $R_4$ in FIG. 6) in accordance with the cam arm 25. Since, however, the rear end part of the swing arm 7 is fixed by the stopper 11, the turning arm 14 is contracted against the urging forces by a reaction exerted from the side edge of the cam hole 10. When the connecting pin 21 is reset to the neutral position of the cam hole 10, the stopper 18 mounted on one slide plate 15 is brought into engagement with the side end part of the other slide plate 15a by the lug 19 as illustrated in FIG. 2 or FIG. 3, and the various parts of the apparatus are reset into the initial state illustrated in FIG. 1.

As described above, according to the present invention, braking can be released in respective modes arranged on both the sides of a stop position, and yet, the braking can be instantly applied at the time of transfer from a fast-forward or rewind mode to a stop mode. In addition, the brake system of the present invention has a turning arm constructed stretchable and contractible, and it is applicable to both the application and release of the braking, depending upon whether this turning arm is turned in the contracted state or is stretched. Therefore, it is remarkably simplified in construction and is suited to practical use when compared with a brake system which is individually furnished with a mechanism for applying braking and a mechanism for releasing the braking. Accordingly, the present invention need not employ a solenoid as in the prior art and can curtail the manufacturing cost of the brake system (for example, down to about 1/10 or less as compared with the type employing the solenoid), in turn, the magnetic recording and reproducing apparatus. Moreover, it can achieve the advantages in practical use that the weight of the apparatus is rendered lighter and that the term of a battery replacement cycle is rendered longer.

What is claimed is:

1. A brake system for a magnetic recording and reproducing apparatus including reel table means for driving and rotating at least one pair of reels so as to extend a magnetic tape across them, and friction members adapted to be selectively pressed against side surfaces of the reel table means said brake system comprising:

rotatably mounted brake arms each of which is provided with the friction member at one end portion thereof confronting a corresponding reel table means in a vicinity of a rotational side surface of said reel table means, urging means for normally urging said friction members toward said reel table means through said brake arms, a swing member for displacing said friction members in a direction away from said reel table means against a force of said urging means, a turning arm connected to one end of said swing member, said turning arm being extensible and contractible in a direction of an axis of said turning arm so that when turned in a contracted state, it swings said swing member to bring said friction members away from respectively corresponding reel table means and that when extended, it swings said swing member in an opposite direction to press said friction members against said reel table means, drive means for turning said turning arm in an operation mode, and drive means for extending said turning arm in a stop mode.

2. A brake system for a magnetic recording and reproducing apparatus as defined in claim 1, wherein said drive means for turning said turning arm includes a cam groove, and a cam arm means cooperable with said cam groove and positioned thereby.

3. A brake system for a magnetic recording and reproducing apparatus as defined in claim 1, wherein said turning arm includes at least two slide plates, said drive means for extending said turning arm includes a spring member extended in a direction of extension of said two slide plates, a stopper means for holding said two slide plates in the contracted state against said spring member, and a ratchet means for releasing said stopper means at a stage of transfer from either of fast-forward and rewind modes to the stop mode.

4. A brake system for a magnetic recording and reproducing apparatus as defined in claim 1, wherein the rotatably mounted brake arms are provided in a vicinity of one pair of reel table means, and the friction members with which the respective brake arms are equipped are individually pressed against an associated reel table means.

* * * * *